United States Patent Office 2,781,377
Patented Feb. 12, 1957

2,781,377
DETERGENT SULPHONIC ACID AND SULPHATE SALTS OF CERTAIN AMPHOTERIC DETERGENTS

Hans S. Mannheimer, New York, N. Y.

No Drawing. Application March 9, 1956,
Serial No. 570,409

7 Claims. (Cl. 260—401)

This invention relates to novel compositions and to methods for making them. In one of its more specific aspects, the invention is directed to methods of making and to novel derivates of a certain class of amino carboxylic acid metal salts, which I shall hereinafter refer to as "amino acid metal salts."

Said "amino acid metal salts" are useful as surface active agents, are employed as starting materials in the practice of this invention, and have the following general Formula I:

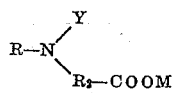

in which R is a hydrocarbon radical of at least 6 carbon atoms and preferably 6–18 carbon atoms, and for most purposes R is preferably such a radical which may be either aliphatic and straight or branch chain or cycloaliphatic or aliphatic-aromatic, with the aliphatic portion being attached to an aromatic nucleus and having at least 3 carbon atoms; Y is selected from the class consisting of $R_6$ and $R_2$—COOM; $R_2$ is an organic group selected from the class consisting of (a) aliphatic, aromatic or aromatic-aliphatic hydrocarbon groups of 1–12 carbon atoms, such as —$CH_2$—, —$C_2H_4$—, —$C_3H_6$—, —$C_4H_8$—, —$C_5H_{10}$—, —$C_6H_{10}$—, —$C_6H_4$—, —$C_6H_4CH_2$—, (b) hydroxy substituted aliphatic hydrocarbon groups of 1–12 carbon atoms, illustrative examples of which are —$CH_2CHOHCH_2$—, —$CH_2CHOHCHOHCH_2$—, (c) aliphatic ether groups, each of said groups having at least one ether oxygen linkage therein and otherwise being hydrocarbon of 2–12 carbon atoms, illustrative examples of which are

—$C_2H_4OCH_2$—, —$(C_2H_4O)_3$—$CH_2$—, —$C_3H_6OCH_2$—

(d) aliphatic ether groups, each of said groups having at least one ether oxygen linkage therein and otherwise being hydroxy substituted hydrocarbon of 2–12 carbon atoms, illustrative example of which is

—$CH_2CHOHCH_2OCH_2$—

(e) aliphatic keto groups, each of said groups having a single carbonyl linkage therein and otherwise being hydrocarbon of 2–12 carbon atoms, illustrative example of which is —$CH_2COCH_2$—, (f) aliphatic keto groups, each of said groups having a single carbonyl linkage therein and otherwise being hydroxy substituted hydrocarbon of 2–12 carbon atoms, illustrative example of which is —$CH_2COCHOHCH_2$—, (g) aliphatic ketoether groups, each of said groups having ether oxygen and single carbonyl linkages therein and otherwise being hydrocarbon or hyroxy substituted hydrocarbon of 2–12 carbon atoms; $R_6$ is selected from the class consisting of hydrogen and monovalent radicals otherwise defined in (a)—(g), examples of which are —$CH_3$, —$C_2H_5$, —$C_3H_7$, —$C_4H_9$, —$C_5H_{11}$, $C_6H_{11}$, —$C_6H_5$, —$C_6H_4CH_3$, —$C_2H_4OH$, —$CH_2CHOHCH_2OH$, etc., —$C_2H_4OCH_3$, etc., —$CH_2COCHOHCH_3$, —$CH_2COCH_3$.

These various "amino acid metal salts" may be prepared in a number of different ways well known to the art, among which are the following: 1 mol of

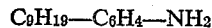

$C_9H_{19}$—$C_6H_4$—$NH_2$ is reacted with 1 and 2 mols respectively of an appropriate monohalo-monacarboxylic acid, such as monochloracetic acid in the presence of aqueous caustic soda, to provide compounds hereinafter known as products A and B respectively, and having the following formulas:

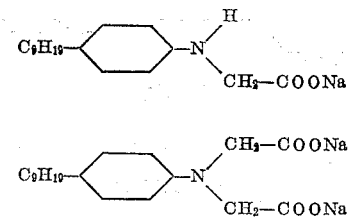

and respectively; 1 mol of $C_9H_{19}$—$NH_2$ may first be reacted with 1 mol of methyl chloride and ethylene chlorhydrin respectively, and subsequently reacted with 1 mol of chloracetic acid in the presence of aqueous caustic soda to provide compounds hereinafter known as products C and D, having the following formulas:

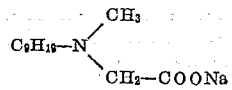

and

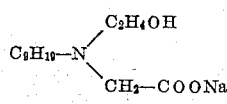

respectively; 1 mol of $C_6H_{11}$—$NH_2$ may be reacted with 1 mol of monochlorlactic acid in the presence of aqueous caustic soda to provide compound hereinafter known as product E, having the following formula:

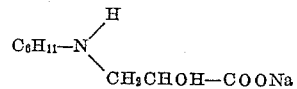

1 mol of $C_{18}H_{35}$—$NH_2$ may be reacted with 1 and 2 mols of monochlorethoxyacetic acid in the presence of aqueous caustic soda and potassium hydroxide respectively, to provide compounds hereinafter known as products F and G respectively, having the following formulas:

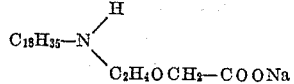

and

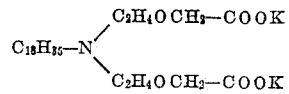

respectively; 1 mol of product A may be reacted with 1 mol of glycerine chlorhydrin and dimethyl hydroxyketone chlorhydrin respectively, to provide products H and J, having the following formulas:

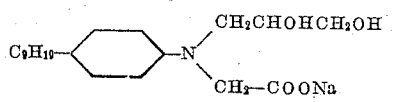

and

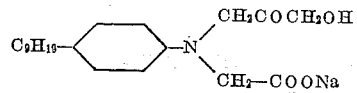

respectively; 1 mol of $C_8H_{17}$—$NH_2$ is reacted with 1 mol of ethylene chlorhydrin and subsequently reacted with 1 mol of monochlorethoxy acetic acid in the presence of aqueous potassium hydroxide, to provide compound hereinafter known as product K and of the following formula:

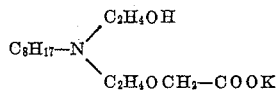

1 mol of $C_6H_{13}$—$NH_2$ is reacted with glycerine chlorhydrin, and dimethyl dihydroxyketone chlorhydrin respectively and 1 mol of each of the resulting compounds are reacted with 2 mols of monochloracetic acid in the presence of caustic soda to provide products L and M of the following formulas:

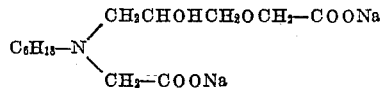

and

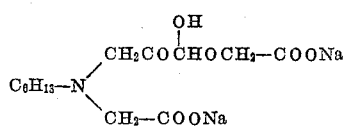

respectively; 1 mol of $C_{17}H_{35}$—$NH_2$ is reacted with 2 mols of glycerine oxide

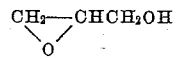

and then with 2 mols of monochloracetic acid in the presence of caustic soda in aqueous solution to provide product N of the following formula:

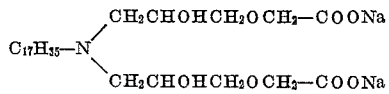

1 mol of a polyethoxy amine, such as diethoxy amine is first reacted with 1 mol of $C_{11}H_{23}Cl$ and 1 mol of resulting compound is reacted with 1 mol of monochlorpropionic acid in the presence of potassium hydroxide or with acrylonitrile ($CH_2$=$CHCN$) and subsequently hydrolized to provide product O of the following formula:

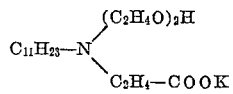

1 mol $C_{10}H_{21}$—$NH_2$ is first reacted with one mol of methyl chloride and subsequently reacted with 1–5 mols of ethylene oxide or 1–4 mols of propylene oxide and, in this specific instance, 3 mols of ethylene oxide and then with 1 mol of monochloracetic acid in the presence of caustic soda to provide product P having the following formula:

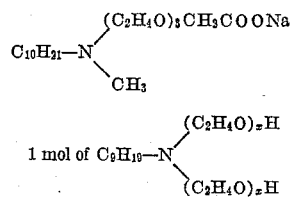

1 mol of $C_9H_{19}$—N$\begin{smallmatrix}(C_2H_4O)_xH\\(C_2H_4O)_xH\end{smallmatrix}$ in which $x$ is 1–5, and in this instance is 4, is reacted with 1 and 2 mols of monochloracetic acid respectively, in the presence of caustic soda, to provide products Q and R respectively having the following formulas:

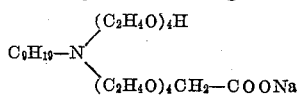

and

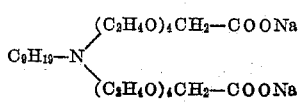

respectively; 1 mol of

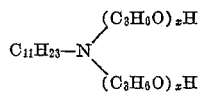

in which $x$ is 1–3, and this example is 3, is reacted with 1 and 2 mols respectively of monochlorpropionic acid, to provide products S and T respectively, having the following formulas:

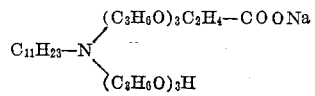

and

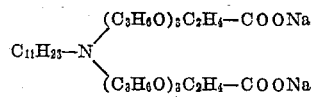

1 mole of $C_{11}H_{23}$—$NH_2$ is reacted in the presence of an aqueous solution of 1 mole of caustic soda with one mole of the following: $ClC_6H_4COOH$ and $$ClCH_2C_6H_4COOH$$

to respectively provide two compounds hereinafter known as products T–1 and T–2 and having the following respective formulas:

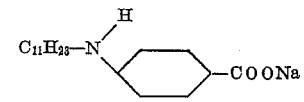

and

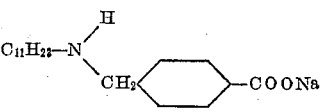

1 mole of product $C_{11}H_{23}$—$NH_2$ is first reacted with 1 mole of $ClC_6H_5$ and then with 1 mole of chloracetic acid in the presence of caustic soda to provide a compound having the following formula and known as product T–3;

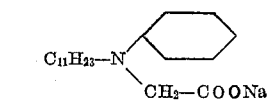

1 mol of product J is reacted with 1 mol of monochloracetic acid in the presence of caustic soda to provide compound hereinafter known as product U having the following formula:

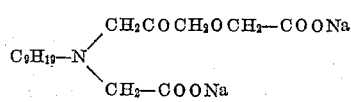

The radical R of all of the formulas hereinbefore and hereinafter set forth is that hereinbefore defined in connection with Formula I. Instead of employing monochloracetic acid, any other appropriate monohalomonocarboxylic acid, such as monochloropropionic, monochlorlactic acids, etc. may be employed. Thus, by merely substituting the particular monohalomonocarboxylic acid for those used in the production of the particular compounds hereinbefore set forth, and/or by employing the various radicals and groups for $R_6$ and $R_2$ but within the definitions thereof as heretofore defined, a very great number of products X, examples of which are products A—H and J—U, are "amino acid metal salts," which may be employed as starting materials or reactants in the practice of this invention.

Prior to this invention, it was known that cationic surface active agents and anionic surface active agents when together in aqueous solution resulted in the production or formaton of water insoluble compounds; and that adding an anionic surface active agent to an aqueous solution of another anionic surface active agent resulted in a mere physical combination of said agents and that no reaction would occur between them.

Said "amino acid metal salts" normally behave anionically in aqueous solutions having a pH above 7, and consequently it was expected that said "amino acid metal salts" when in aqueous solution together with anionic surface agents that they would be combined physically only and that no chemical reaction would occur therebetween. In the course of my experimentations, I have discovered that said "amino acid metal salts" could be reacted with certain anionic surface active agents at a pH above 7 to produce water-soluble reaction products. Not only did I make said discovery, but I further discovered that water solutions of such reaction products had viscosities greater than corresponding aqueous solutions of the "amino acid metal salts" and also exhibited better foaming characteristics than did said "amino acid metal salts" in very low dilutions under extreme water hardness conditions. Said reaction products are non-toxic and non-irritating to the human skin. They have been found eminently useful as general utility detergents, such as for car washing, dish washing, clothes washing, etc. Said "amino acid metal salts" when used as components of shampoos sometimes caused slight irritation or stinging of the eyes when such shampoos were used and water solutions thereof accidentally reached the eyes. I have further discovered that the reaction products of this invention caused practically no irritation or stinging of the eyes when so employed.

According to this invention, one or a combination of two or more of said "amino acid metal salts" of the general structural Formula I are reacted with one or a combination of two or more anionic surface active agents of the following general structural Formula II to provide novel, water-soluble compounds having the following general structural Formula III, and having high wetting, detergency, and surface active properties and capable of providing voluminous and stablefoams in aqueous solutions, and which aqueous solutions are substantially non-irritating to the skin and eyes of normal human beings.

*Formula II*

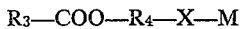

R₃—COO—R₄—X—M

*Formula III*

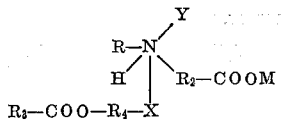

wherein R₃ is selected from the group consisting of (a) aliphatic and aliphatic-aromatic hydrocarbon radicals of 6–18 carbon atoms, with the aliphatic-aromatic hydrocarbon radicals, each having an aliphatic radical of at least 6 carbon atoms; R₄ is selected from the group consisting of (b) aliphatic hydrocarbon groups of 1–12 carbon atoms, (c) hydroxy substituted aliphatic hydrocarbon groups of 1–12 carbon atoms, (d) aliphatic ether groups, each of said groups having at least one ether oxygen linkage therein, which may be in the range of 1–6, and otherwise being hydrocarbon of 2–12 carbon atoms, (e) hydroxy substituted aliphatic ether groups, each of said groups having at least one ether oxygen linkage therein, which may be in the range of 1–6, and otherwise being hydroxy substituted hydrocarbon of 2–12 carbon atoms, (f) aliphatic groups, each group containing a —CONH— linkage therein and otherwise being hydrocarbon of 2–12 carbon atoms; X is a radical selected from the group consisting of —SO₃ and —OSO₃; R, R₂, Y and M have heretofore been defined.

According to this invention, I react a compound of Formula I wth a compound of Formula II to provide the novel and highly useful compounds of Formula III. In general, this reaction is carried out in a solution containing compounds I and II and to which a quantity of an acidic agent such as a strong mineral acid, as for example hydrochloric, sulphuric or its equivalent, has been added to lower the pH of the solution to a value of approximately 7 to approximately 9 and while maintaining the mass at a temperature between approximately 100–200° F. In this reaction under the aforesaid conditions, the compounds of Formula III are produced, said compounds having high water solubility.

Such compounds of Formula III have an unexpected extremely high water-solubility, while the corresponding salts of cationic compounds are water-insoluble. The resultant aqueous solution can be used directly as a surface active agent, wetting agent or detergent for the purposes indicated for the "amino acid metal salts." While the quantities of the compound of Formula I and compound of Formula II may be equimolecular for good yield of compounds of Formula III, I may employ an excess of either, and in general the mole ratio of a compound of Formula I to compound of Formula II may be 2 moles of the former to 1–3 moles of the latter.

One of the specific methods which I prefer to employ in carrying out an aspect of this invention is to first dissolve a compound of Formula I in water and then the pH thereof is adjusted to approximately 12–13 (measured electrically) by the addition of aqueous caustic soda if required so that when a compound of Formula II is added thereto, the pH of the solution of I and II will be at least 10 and generally 10.5–11. The temperature of said solution is raised to 100–200° F. and preferably in factory practice to approximately 140° F. Then a quantity of a compound of Formula II is dissolved in water in a separate container and this solution is added to said first solution and the mass is maintained in said temperature range while being constantly stirred, and an acidic agent is added thereto to reduce the pH thereof to a value below 10 and in the range of approximately 7 to 9, and preferably of approximately 8.2 to approximately 8.7. At the end of the acidic agent addition, the stirring is continued and the temperature of the mass maintained for about 10–20 minutes after which the solution is allowed to cool and is a finished product.

The following are specific examples merely given by way of illustrating the invention and are not to be taken by way of limitation, all parts being given by weight unless otherwise specified.

EXAMPLE 1

An aqueous solution of 300 parts of product A in 450 parts of water is heated to approximately 140° F. and its pH (measured electrically) is adjusted by the addition of aqueous caustic soda to 12–13. While being constantly stirred and maintained at that temperature, there is added a solution of 350 parts of

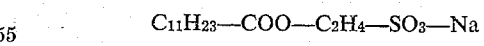

C₁₁H₂₃—COO—C₂H₄—SO₃—Na in 600 parts of water. Then while stirring and the temperature is maintained there is added thereto between about 30–40 parts of hydrochloric acid solution (32%) whereby the pH of the mass is lowered to a value in the range of 8.2 to 8.7. Stirring is continued and the temperature maintained for about 10 minutes more. The resultant product is a solution of the novel reaction product having the following formula:

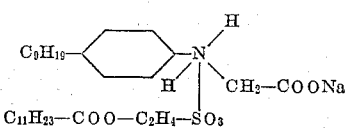

EXAMPLE 2

Employ the same procedure and components as set forth in Example 1, except that only about 150 parts of C₁₁H₂₃—COO—C₂H₄—SO₃—Na are used. In this instance, the resultant product is a solution of the novel reaction product whose structural formula is shown in Example 1 together with unreacted product A used, in the approximate proportion of two parts of the former to one of the latter.

Employ the same procedure as that set forth in Example 1, but employ the components indicated in the following Examples 3–27; the quantity of hydrochloric acid solution (32%) is variable to lower the pH to values indicated in Example 1 to obtain the novel reaction products of said Examples 3–27.

EXAMPLE 3

380 parts of product B in 600 parts of water. 310 parts of $C_8H_{17}$—COO—$CH_2CHOHCH_2$—$SO_3$—Na in 600 parts of water.

FORMULA OF NOVEL REACTION PRODUCT

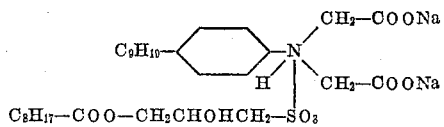

EXAMPLE 4

240 parts of product C in 360 parts of water. 330 parts of

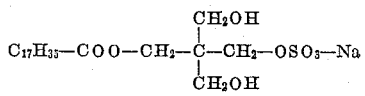

in 500 parts of water.

FORMULA OF NOVEL REACTION PRODUCT

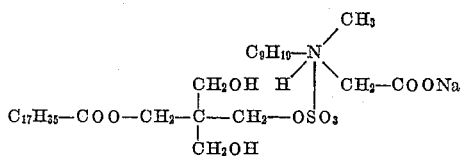

EXAMPLE 5

270 parts of product D in 405 parts of water. 360 parts of $C_9H_{19}$—COO—$C_2H_4OC_2H_4$—$OSO_3$—Na in 600 parts of water.

FORMULA OF NOVEL REACTION PRODUCT

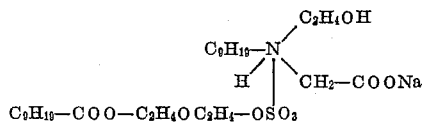

EXAMPLE 6

210 parts of product E in 315 parts of water. 400 parts of $C_{11}H_{23}$—COO—$C_2H_4CHOHOCH_2$—$OSO_3$—Na in 600 parts of water.

FORMULA OF NOVEL REACTION PRODUCT

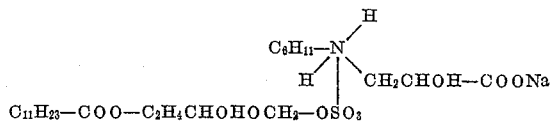

EXAMPLE 7

390 parts of product F in 585 parts of water. 500 parts of $C_{10}H_{21}$—COO—$C_2H_4NHCOCH_2$—$SO_3$—Na in 600 parts of water.

FORMULA OF NOVEL REACTION PRODUCT

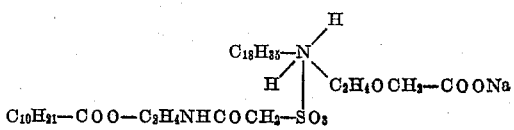

EXAMPLE 8

270 parts of product G in 400 parts of water. 500 parts of $C_6H_{13}$—COO—$C_2H_4OC_2H_4OC_2H_4$—$OSO_3$—Na dissolved in 750 parts of water.

FORMULA OF NOVEL REACTION PRODUCT

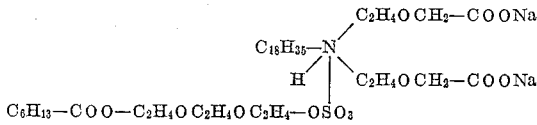

EXAMPLE 9

350 parts of product H in 500 parts of water. 420 parts of

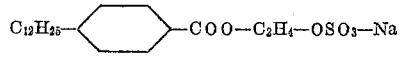

in 650 parts of water.

FORMULA OF NOVEL REACTION PRODUCT

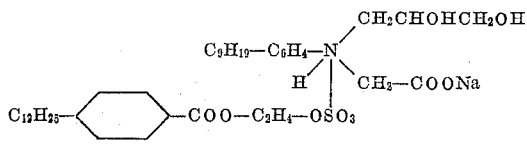

EXAMPLE 10

320 parts of product J in 480 parts of water. 400 parts of $C_{17}H_{35}$—COO—$C_2H_4$—$SO_3$—Na

FORMULA OF NOVEL REACTION PRODUCT

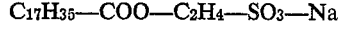

EXAMPLE 11

375 parts of product K in 550 parts of water. 350 parts of

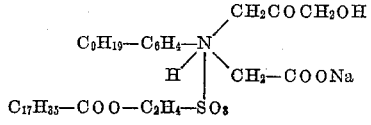

in 450 parts of water.

FORMULA OF NOVEL REACTION PRODUCT

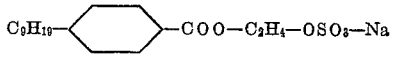

EXAMPLE 12

400 parts of product L in 600 parts of water. 300 parts of $C_6H_{13}$—COO—$C_2H_4$—$SO_3$—Na in 450 parts of water.

FORMULA OF NOVEL REACTION PRODUCT

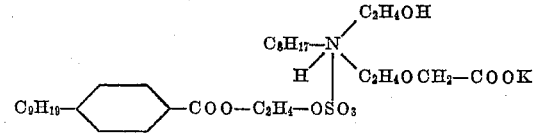

EXAMPLE 13

400 parts of product M in 600 parts of water. 400 parts of

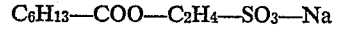

in 600 parts of water.

FORMULA OF NOVEL REACTION PRODUCT

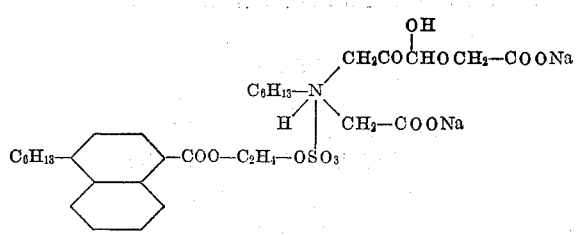

EXAMPLE 14

415 parts of product N in 620 parts of water. 300 parts of $$C_4H_{13}-COO-CH_2CHOHCH_2-OSO_3-Na$$

in 450 parts of water.

FORMULA OF NOVEL REACTION PRODUCT

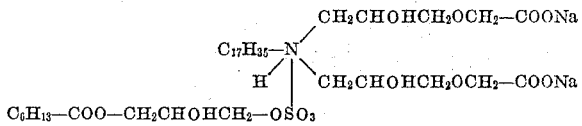

EXAMPLE 15

315 parts of product O in 525 parts of water. 400 parts of $$C_{13}H_{27}-COO-C_2H_4-SO_3-Na$$

in 600 parts of water.

FORMULA OF NOVEL REACTION PRODUCT

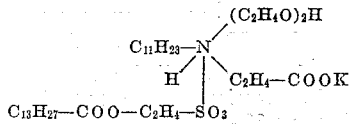

EXAMPLES 16–24

Employing the same procedure as that set forth in Example 1, except that for the approximately 1 mole proportion of product A used in Example 1, substitute approximately 1 mole proportion of products P, Q, R, S, T, T-1, T-2, T-3, and U respectively and a quantity of water equal to about one and one half times the weight of said products employed, to produce novel reaction products having the same formula as that of the novel reaction product of Example 1, except that the formulas of said products P, Q, R, S, T, T-1, T-2, T-3, and U are respectively substituted for the formula of product A therein.

EXAMPLES 25–26

Employing the same procedure as that set forth in Example 1, except that instead of product A, there are employed 1 mole respectively of the following compounds:

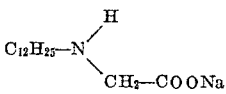

and

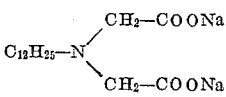

to produce compounds having the same formulas respectively as the novel reaction product of Example 1, except that the aforesaid formulas are substituted for that of product A therein.

EXAMPLE 27

Employ the same salt of sulfate or sulfonate reactants of Examples 1–26, except that salts of sulfates are used in place of the sulfonates, and vice-versa.

The specific reactants of Formula II employed herein may differ from those used in the aforesaid examples by substituting $SO_3$ for $OSO_3$ and vice-versa, for they are equivalents.

Following the same procedure as that set forth in Example 1 and employing 1 mol of any of said other starting materials, respectively, and 1 mol of any of the other specific compounds of Formula II employed in Examples 1–27, a great number of other novel reaction products whose formulas are that of Formula III may be produced; and in addition, the specific reactants employed may differ from those employed herein, in varying R, $R_1$, $R_2$, $R_4$ and $R_3$ within the definitions thereof, to provide a great number of other compounds of Formula III.

It is to be understood that instead of first adjusting the pH of the compound of Formula I to 12—13 before the addition of the compound of Formula II, any other method may be employed to obtain the condition whereby the pH of the solution of I and II is at least 10 and preferably 10.5–11 before the addition of the acidic agent to lower the pH of the mass to approximately 7 to approximately 9. For example, I and II may be dissolved together and this solution may, by the addition of caustic soda when required, have its pH adjusted to at least 10, and then at 100–200° F. is ready for the addition of the acidic agent to lower its pH to approximately 7 to approximately 9. If desired, the required amount of acidic agent may be added either before or after the solution of pH of at least 10 is brought to a temperature in the range of 100–200° F.

Since certain changes in carrying out the aforesaid processes and certain modifications in the compositions which embody the invention may be made without departing from its scope, it is intended that all matter contained in the description shall be interpreted as illustrative and not in a limiting sense.

It is also to be understood that the following claims are intended to cover all the generic and specific features of the invention herein described, and all statements of the scope of the invention which as a matter of language might be said to fall therebetween.

I claim:

1. A compound of the following formula:

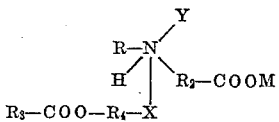

in which R is a hydrocarbon radical of 6–18 carbon atoms; Y is selected from the class consisting of $R_6$ and $R_2$—COOM; $R_2$ is an organic group selected from the class consisting of (a) aliphatic, aromatic and aromatic-aliphatic hydrocarbon groups of 1–12 carbon atoms, (b) hydroxy substituted aliphatic hydrocarbon groups of 1–12 carbon atoms, (c) aliphatic ether groups, each of said groups having at least one ether oxygen linkage therein and otherwise being hydrocarbon of 2–12 carbon atoms, (d) aliphatic ether groups, each of said groups having at least one ether oxygen linkage therein and otherwise being hydroxy substituted hydrocarbon of 2–12 carbon atoms, (e) aliphatic keto groups, each of said groups having a single carbonyl linkage therein and otherwise being hydrocarbon of 2–12 carbon atoms, (f) aliphatic keto groups, each of said groups having a single carbonyl linkage therein and otherwise being hydroxy substituted hydrocarbon of 2–12 carbon atoms, (g) aliphatic keto-ether groups, each of said groups having ether oxygen and single carbonyl linkages therein and otherwise being hydrocarbon of 2–12 carbon atoms, (h) aliphatic keto-ether groups, each of said groups having ether oxygen and single carbonyl linkages therein and otherwise being hydrocarbon of 2–12 carbon atoms; $R_6$ is selected from the class consisting of (i) hydrogen and (j) monovalent radicals otherwise defined in (a)—(h); $R_3$ is a radical selected from the class consisting of (k) aliphatic and aliphatic-aromatic hydrocarbon radicals of 6–18 carbon atoms; $R_4$ is a group selected from the class consisting of (l) aliphatic hydrocarbon groups of 1–12 carbon atoms, (m) hydroxy substituted aliphatic hydrocarbon atoms of 1–12 carbon atoms, (n) aliphatic ether groups, each of said groups having at least one ether oxygen linkage therein and otherwise being hydrocarbon of 2–12 carbon atoms, (o) aliphatic ether groups, each of said groups having at least 1 ether oxygen linkage therein, and otherwise being hydroxy substituted hydrocarbon of 2–12 carbon atoms, (p) aliphatic groups, each of said groups containing a —CONH— linkage therein and otherwise being hydrocarbon of 2–12 carbon atoms, M is an alkali metal and X is selected from the class consisting of $SO_3$ and $OSO_3$.

2. A compound of the following formula:

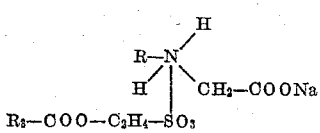

in which R is aliphatic hydrocarbon of 6–18 carbon atoms and $R_3$ is aliphatic hydrocarbon of 6–18 carbon atoms.

3. A compound of the following formula:

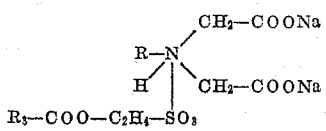

in which R is aliphatic hydrocarbon of 6–18 carbon atoms, and $R_3$ is aliphatic hydrocarbon of 6–18 carbon atoms.

4. A compound of the following formula:

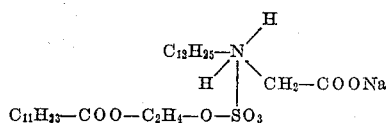

5. A compound of the following formula:

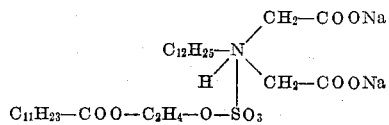

6. A compound of the following formula:

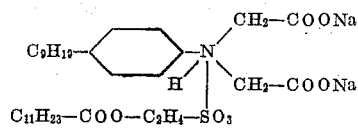

7. A compound of the following formula:

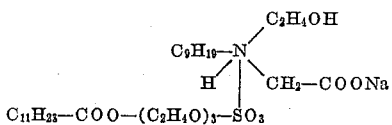

References Cited in the file of this patent

UNITED STATES PATENTS

| | | |
|---|---|---|
| 2,103,872 | Schoeller et al. | Dec. 28, 1937 |
| 2,619,467 | Isbell et al. | Nov. 25, 1952 |

OTHER REFERENCES

Armour and Co., 1954, Bulletin, "Armeens."

Freese et al.: American Perfumer, "Shampoo Uses," March 1956, pages 37–40.